United States Patent [19]

Lynch

[11] Patent Number: 4,796,522

[45] Date of Patent: Jan. 10, 1989

[54] ADJUSTABLE CAM ACTUATOR

[75] Inventor: Joseph A. Lynch, Hillsdale, N.J.

[73] Assignee: Nabisco Brands, Inc., East Hanover, N.J.

[21] Appl. No.: 434,784

[22] Filed: Oct. 18, 1982

[51] Int. Cl.[4] .................................................. A21C 9/06
[52] U.S. Cl. ..................................... 99/450.4; 74/569; 99/450.6
[58] Field of Search ................. 74/124, 569; 99/450.4, 99/450.6

[56] References Cited

U.S. PATENT DOCUMENTS

| Re. 25,072 | 10/1961 | Monaco | 99/450.4 |
|---|---|---|---|
| 1,427,223 | 8/1922 | Miller | 74/124 |
| 1,954,767 | 4/1934 | Foster | 74/124 |
| 2,159,739 | 5/1939 | Johnson | 74/124 |
| 3,119,352 | 1/1964 | Fay | 99/450.4 |
| 3,340,824 | 9/1964 | Talbot | 99/450.4 |
| 3,762,305 | 10/1973 | Glackin | 99/450.4 |
| 3,762,306 | 10/1973 | Staples | 99/450.4 |

FOREIGN PATENT DOCUMENTS

| 652250 | 3/1929 | France | 74/124 |
|---|---|---|---|
| 329739 | 9/1935 | Italy | 74/124 |

Primary Examiner—Allan D. Herrmann
Attorney, Agent, or Firm—Richard Kornutik

[57] ABSTRACT

A cam actuator in a creme sandwich filling machine having a rotating annular drum containing four rows of pistons for extracting filling material from a hopper and depositing a layer of the material on a base cake. A series of identical cams are mounted on a shaft coaxial with the drum, and the pistons are moved radially with respect to the drum by cam followers engaging the cams. The cams are formed so that translation thereof along the axis of the drum brings the cam followers into contact with a different cam contour to adjust the stroke of the pistons.

9 Claims, 7 Drawing Sheets

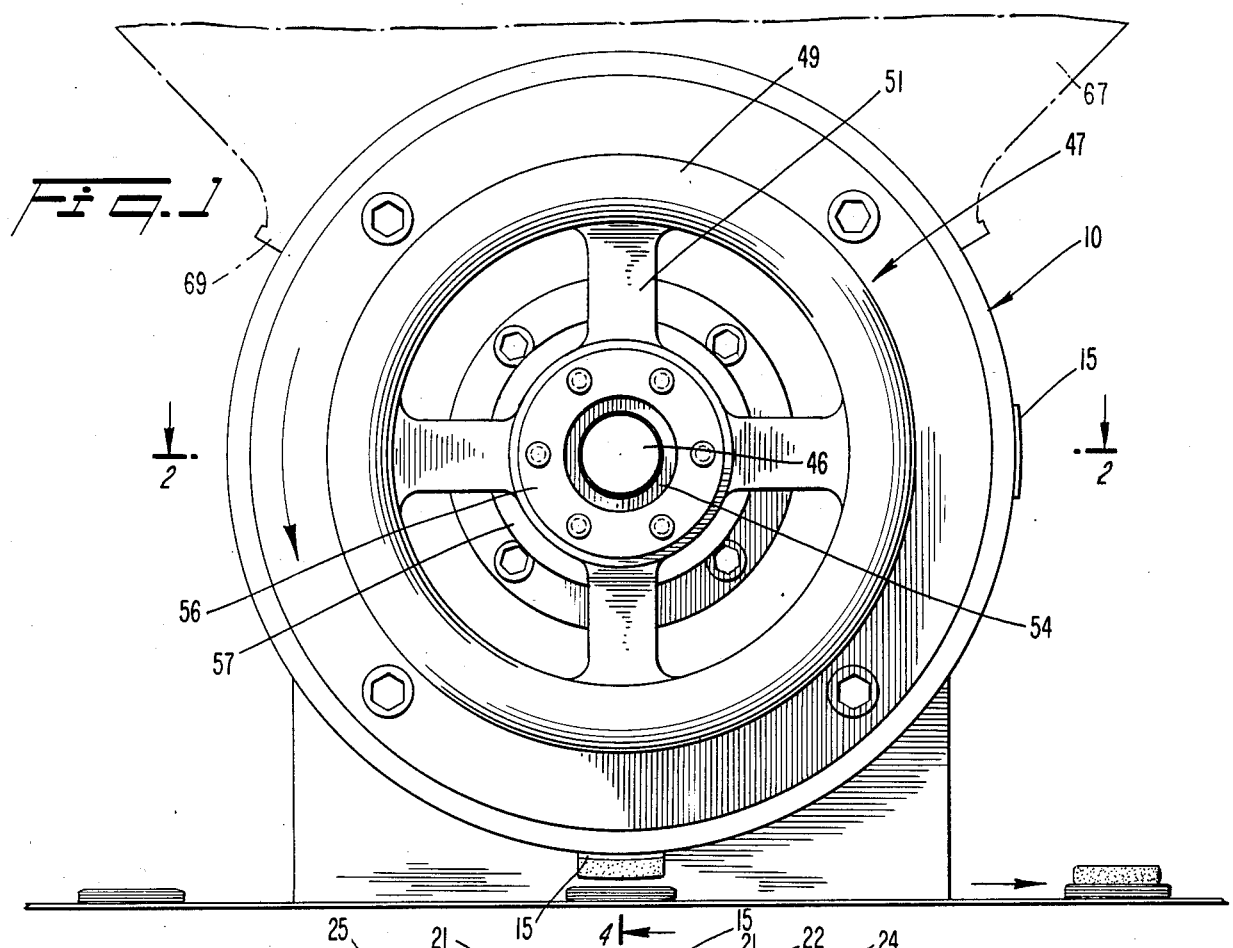
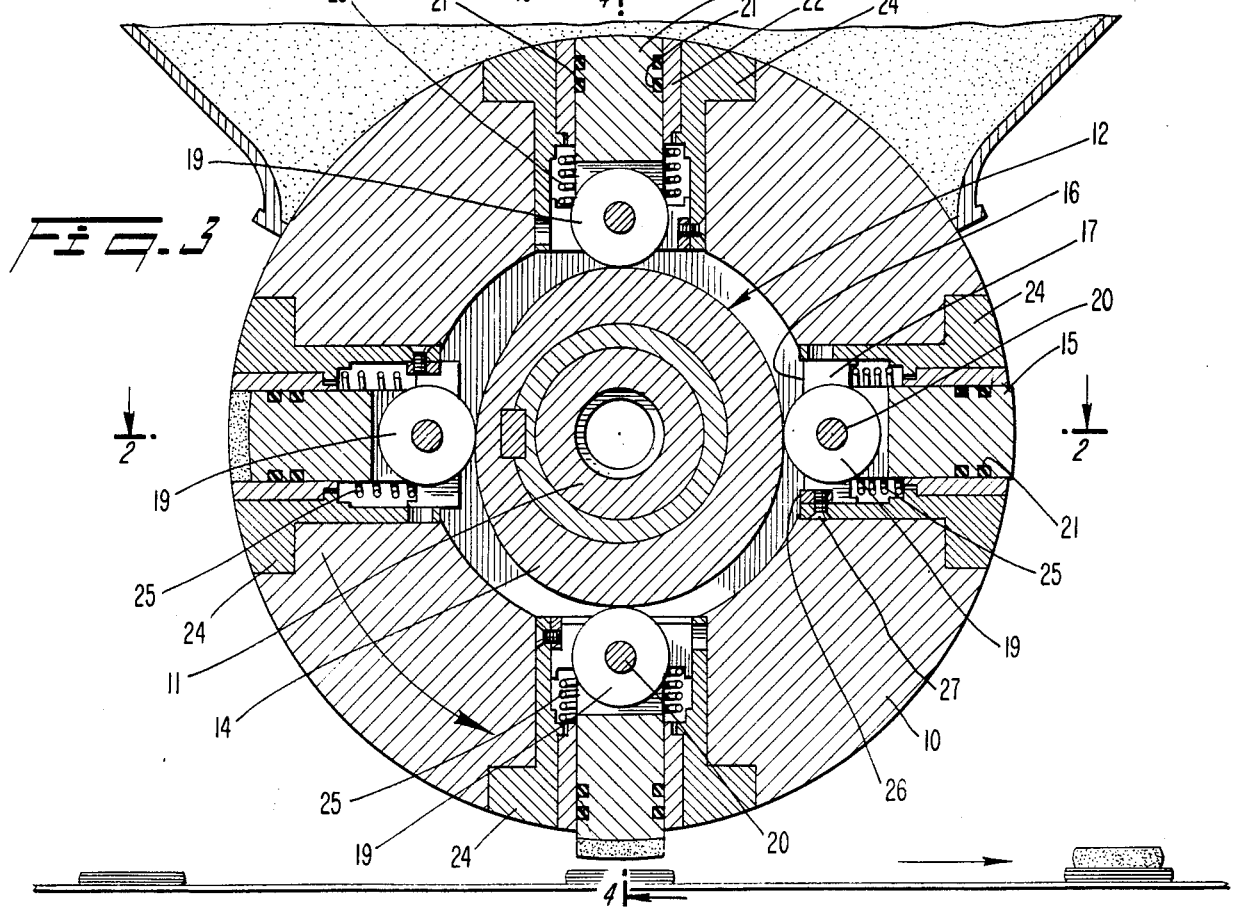

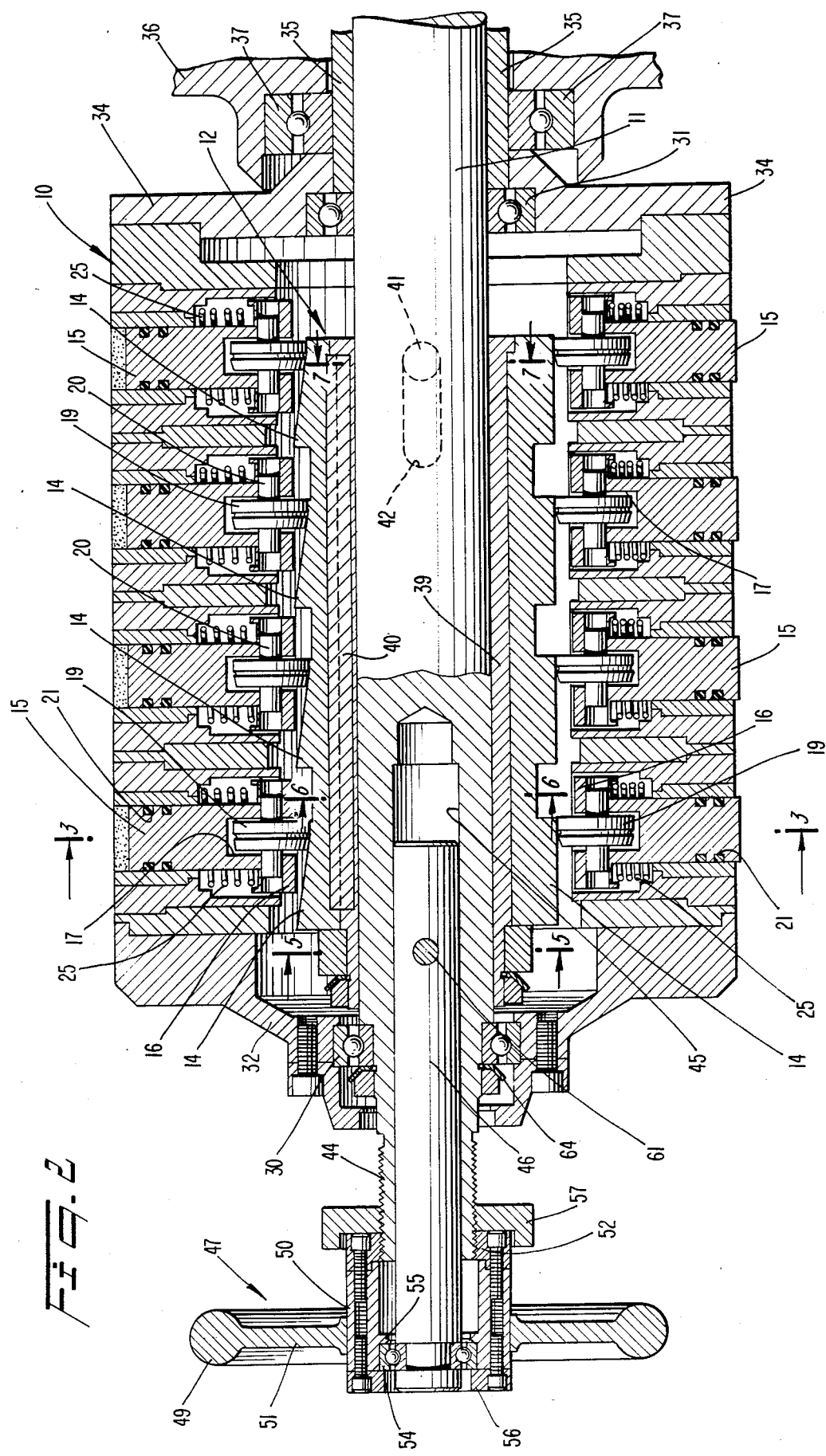

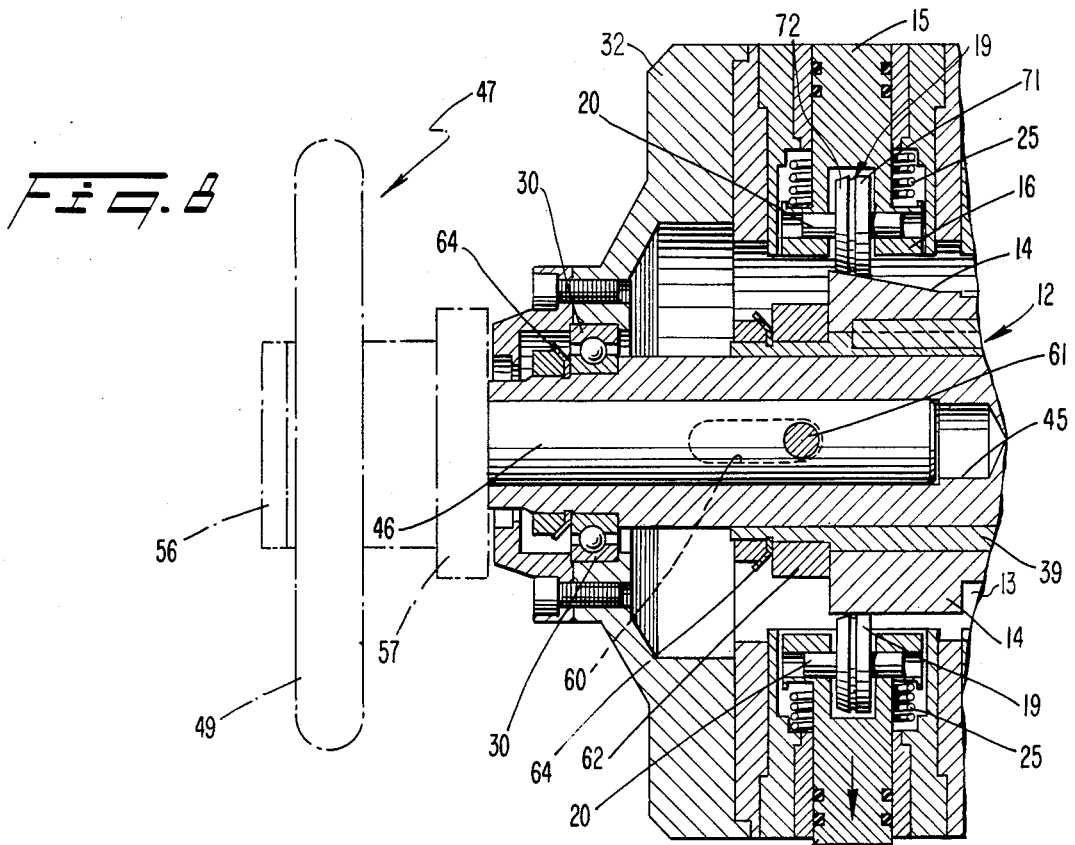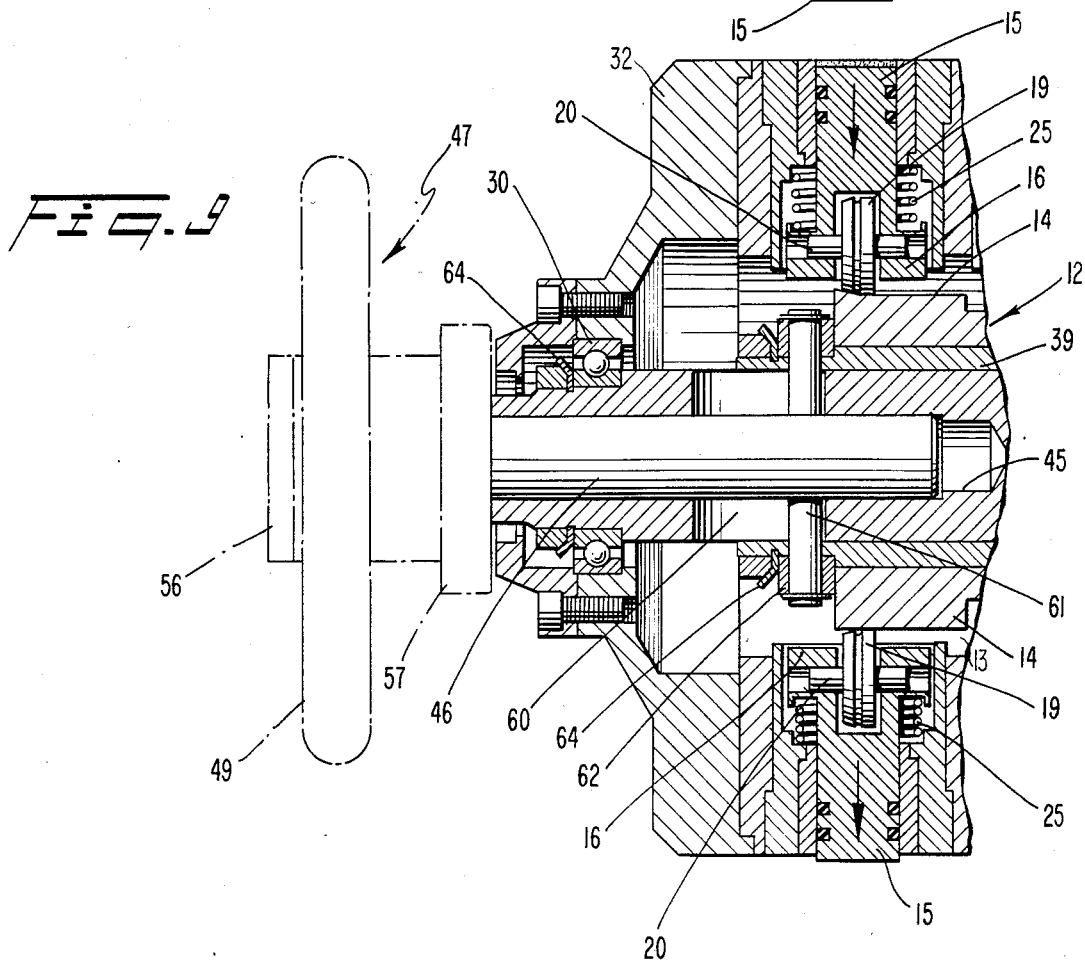

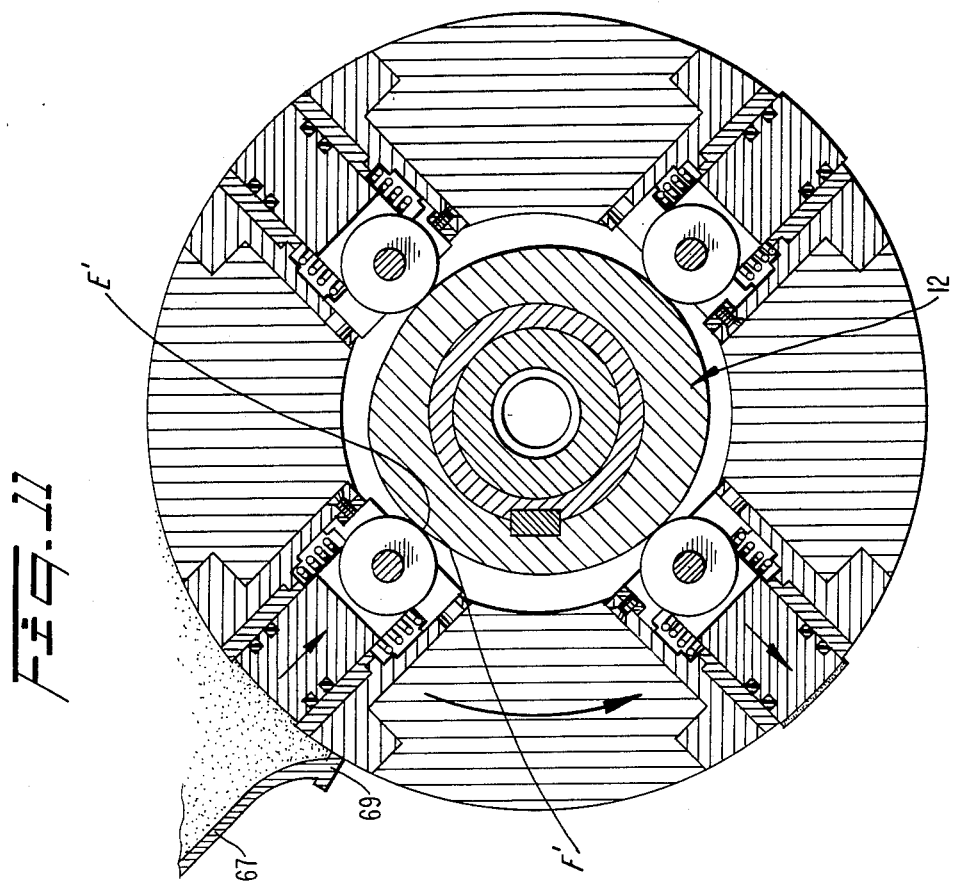
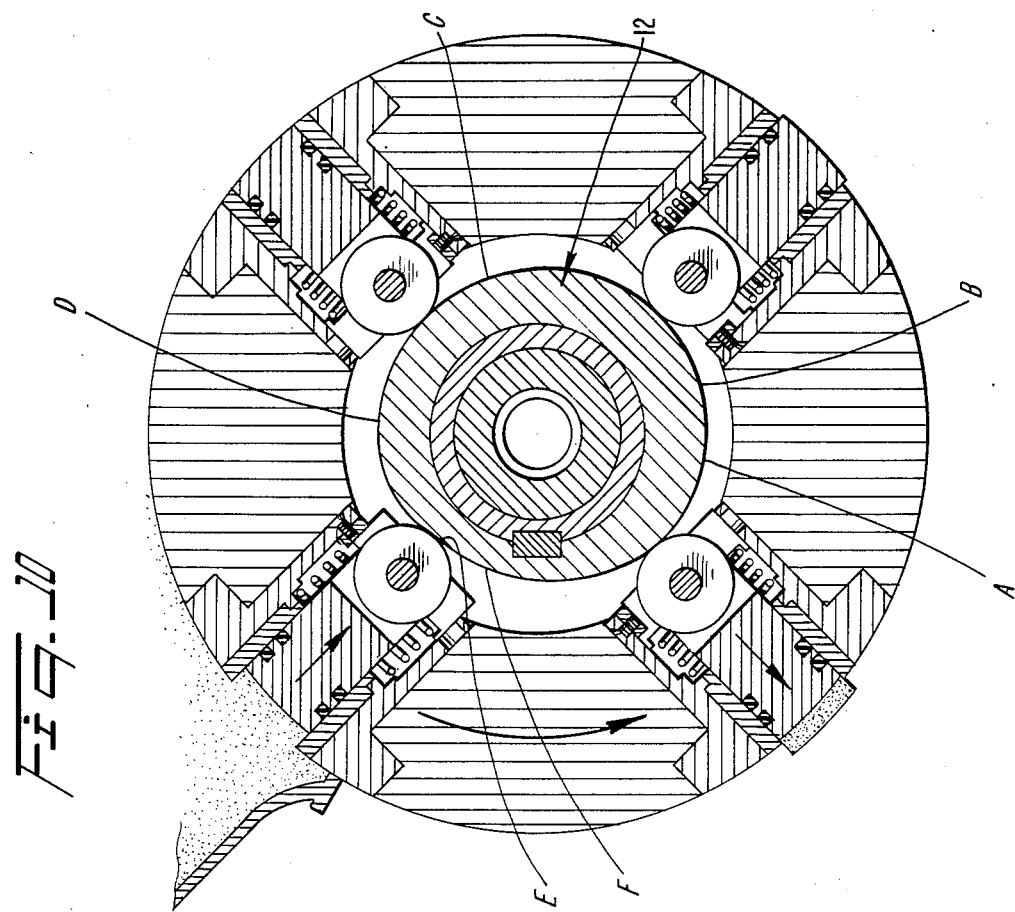

ADJUSTABLE CAM ACTUATOR

BACKGROUND OF THE INVENTION

The present invention relates to cam actuators and more particularly to cam actuators providing an adjustable stroke.

In the manufacture of creme filled sandwiches and the like, the filling material is extracted from a hopper by pistons mounted in a thick walled drum rotating beneath the hopper. As the pistons move under the hopper, they are moved inwardly to draw a slug of filling into the piston cylinder. The drum is mounted above a conveyor belt carrying base cakes. As the drum rotates carrying the pistons from the hopper downwardly, the pistons are extended to move the slug of filling to a position external of the drum so it can be removed and dropped onto a base cake.

The radial motion of the pistons is controlled by a cam mounted coaxially within the drum. The pistons have cam following rollers on their inner ends. The pistons are spring loaded to hold the cam followers against the cams.

It is desirable to be able to vary the thickness of the creme filling so that different varieties of creme sandwiches can be produced on the same equipment.

In the past, this has been accomplished by providing the cams with a particular shape and by adjusting the rotational position of the cam with respect to the hopper. The cam was formed so that as the piston passes under the hopper, it is retracted to withdraw a thick slug of filling and then begins to gradually extend. The thickness of the slug placed on the base cake was determined by the radial position of the piston as it moved past a wiper at the exit edge of the hopper. The gradual extension normally began before the piston reached the wiper and continued after the piston had moved past the wiper.

With this arrangement, the thickness of the slug was increased or decreased by rotating the cam to increase or decrease the thickness of the slug as it passed under the wiper.

This arrangement had the disadvantage of producing tapered slugs of filling which resulted in sandwiches in which the upper and lower base cakes were nonparallel. The taper of the slug was caused by the continued radial motion of the piston as it passed under the wiper. The thickness of the slug at the leading edge was determined by the spacing between the leading edge of the piston and the wiper as it passed underneath. Likewise, the thickness of the slug at the trailing edge was determined by the space between the wiper and the trailing edge of the piston as that edge passed underneath.

In order that the slug be of uniform thickness from its leading edge to its trailing edge, it is necessary that the piston not move in the radial direction as it passed under the wiper.

SUMMARY OF THE INVENTION

It is an object of the present invention to provide a cam actuating mechanism with provision for adjustment which changes the stroke pattern of a reciprocating element during one portion of an operational cycle without changing the stroke pattern during another portion of the cycle.

Another object is to provide a creme sandwich filling machine which is adjustable to produce slugs of creme filling of different thicknesses, each slug being of uniform thickness throughout.

The foregoing objects are accomplished by providing an actuator comprising a cam, a cam follower connected to a reciprocating element, said cam having a cam track for moving the element through a stroke pattern, said cam having a surface including a formation laterally adjacent to the track for providing additional cam tracks parallel to the first for moving the element through different stroke patterns, means for moving the cam with respect to the cam follower to cause the cam follower to travel the length of the cam along one of the tracks, and means for moving the cam laterally with respect to the cam follower to change the track followed by the follower.

BRIEF DESCRIPTION OF THE DRAWINGS

A preferred embodiment of the invention has been chosen for the purposes of illustration and description, and is shown in the accompanying drawings, forming a part of the specification, wherein:

FIG. 1 is an end elevational view of a sandwich filling machine incorporating the actuator of the present invention;

FIG. 2 is a longitudinal sectional plan view taken along the line 2—2 on FIG. 1 (and on FIG. 3);

FIG. 3 is a transverse sectional elevation view taken along line 3—3 on FIG. 2;

FIG. 8 is a sectional view taken along the same line as FIG. 2 showing the cam in a different longitudinal position;

FIG. 9 is a sectional view taken along the same line as FIG. 4 showing the cam in the longitudinal position of FIG. 8;

FIG. 10 is a transverse sectional view similar to FIG. 3 showing the drum rotated 45 degrees and the cam in the position of FIGS. 2 and 4 to form a thick slug of filling;

FIG. 11 is a transverse sectional view similar to FIG. 10 with the cam in the position of FIGS. 3 and 9 to form a thin slug of filling.

DESCRIPTION OF THE PREFERRED EMBODIMENT

Figure 4:
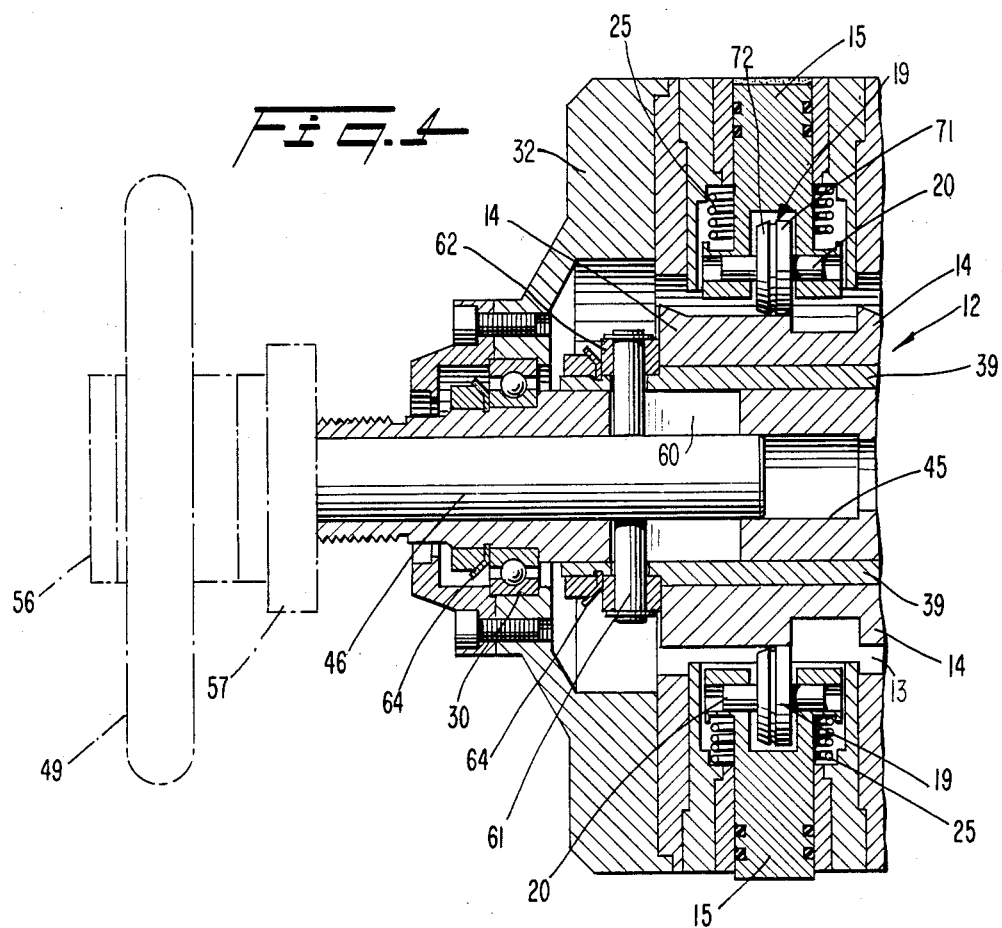
FIG. 4 is a longitudinal sectional view taken along line 4—4 on FIG. 3.

Referring to the drawings in detail, there is shown a creme sandwich filling machine, equipped with an adjustable cam actuator in accordance with the present invention. As shown in FIGS. 1-3, the creme sandwich filling machine has a cylinder 10 mounted for rotation on a stationary shaft 11. The cylinder 10 is tubular and provides an annular space 13 surrounding the shaft 11. A tubular cam member 12 is slideably mounted on the shaft 11 within the space 13 and is formed with four identical cam elements 14 evenly spaced along its length.

Within the cylinder 10, a row of circumferentially-spaced pistons 15 are provided in alignment with each of the cam elements 14. As shown in FIG. 3, each circumferential row consists of four pistons 15, equally spaced about the cylinder. Each piston 15 has an enlarged inner-end portion 16 which is provided with a slot 17 in which a cam-following roller 19 is mounted on an axle 20.

The outer end of each piston is provided with O-ring seals 21 and reciprocates within a short sleeve 22 which is pressed into a long sleeve 24 that is, in turn, pressed into a radially oriented bore formed in the cylinder 10. The inner end of the sleeve 24 is formed to receive a helical spring 25 which engages the enlarged inner end position 16 of the piston and holds the roller 19 against the cam element 14.

Each of the pistons 15 is prevented from rotating within its sleeve 24 by a small block 26 positioned in the slot 17 and fastened to the wall of the sleeve 24 by a screw 27. The presence of the block 26 maintains the alignment of the roller 19 with respect to the cam elements 14.

The cylinder 10 is mounted for rotation on the shaft 11 by means of bearings 30 and 31 (FIG. 2) carried by end plates 32 and 34 respectively. The end plate 34 is connected to a tubular shaft 35 surrounding the stationary shaft 11. The shaft 35 is rotationally driven to rotate cylinder 10. The shaft 35 extends into a stationary supporting hub 36 and is journaled therein by means of an outer bearing 37 and an inner bearing (not shown) spaced along the shaft 35.

Figure 7:
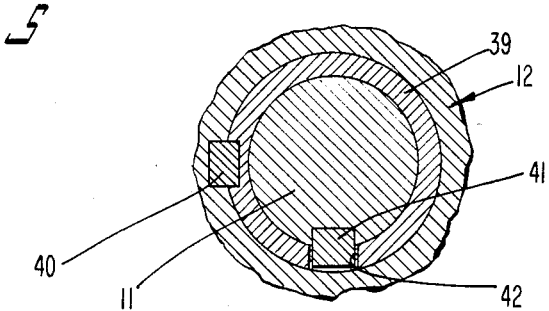
FIG. 7 is a partial transverse sectional elevation view taken along line 7—7 on FIG. 2 and having the same orientation as FIG. 6.

The tubular cam member 12 is mounted on a sleeve 39 to which it is rotationally locked by means of a key 40. The key 40 is sealed in key-way slots milled into the inner surface of the member 12 and the outer surface of the sleeve 39. The sleeve 39 is slideably mounted on the shaft 11 and is rotationally locked thereto by means of a key 41, protruding from the shaft 11 and a slot 42 formed in the sleeve 39. The key 41 is a cylindrical pin pressed into a matching bore in the shaft 11 as shown in FIG. 7. The slot 42 in the sleeve 39 extends axially to permit the sleeve to slide upon the shaft 11 while being rotationally locked thereto.

The shaft 11 is formed with a threaded lift end portion 44 of reduced diameter, as shown in FIG. 2. A bore 45 extends axially from the left end of the shaft 11. A rod 46 is positioned in and extends from the bore 45.

The axial position of the rod 46 within the bore 45 is controlled by a hand wheel 47. The hand wheel 47 has a hand ring 49 attached to a hub 50 by spokes 51. A threaded ring 52 engaging the shaft portion 44 is bolted to the inner end of the hub 50. A locking nut 57 is also provided on the shaft portion 44.

Figures 5, 6:
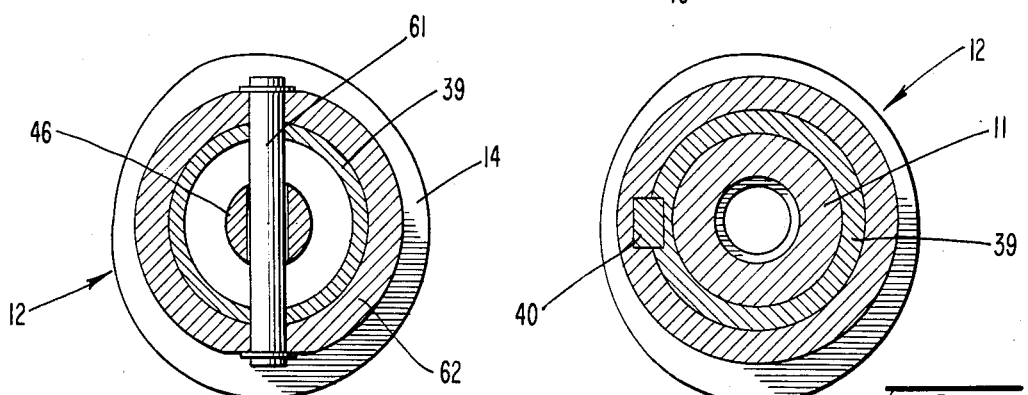
FIG. 5 is a partial transverse sectional elevation view taken along line 5—5 on FIG. 2, and having the same orientation as FIG. 3.
FIG. 6 a partial transverse sectional elevation view taken along line 6—6 on FIG. 2 and having the same orientation as FIG. 5.

Referring now particularly to FIGS. 4 and 5, the shaft 11 is formed with a diametrically-extending slot 60 intersecting the bore 45. A pin 61 in the slot 60 extends through the rod 46, the sleeve 39, and a ring 62 mounted on the sleeve 39. The sleeve 39 is of reduced diameter at this point and the ring 62 is locked to the sleeve by a retaining ring 64.

DESCRIPTION OF THE PREFERRED EMBODIMENT

Figure 12:
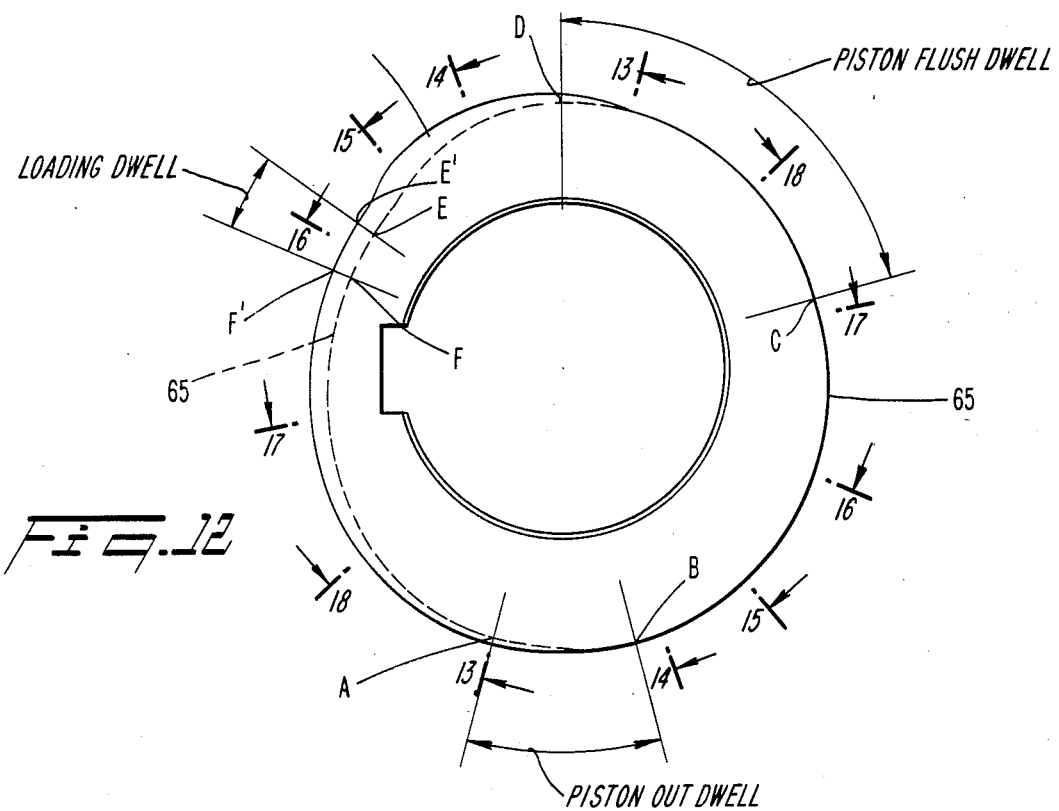
FIG. 12 is a partially schematic end elevational view of the cam of FIGS. 2-11.
Figure 13:
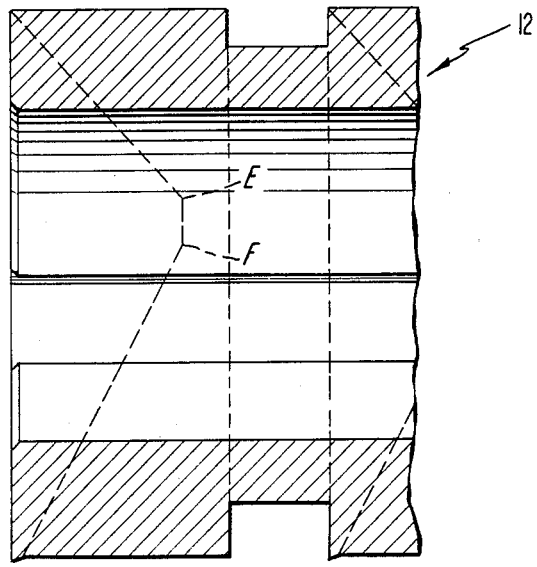
FIGS. 13, 14, 15, 16, 17, and 18 are sectional views taken on FIG. 12 along lines 13—13, 14—14, 15—15, 16—16, 17—17, and 18—18, respectively.
Figure 14:
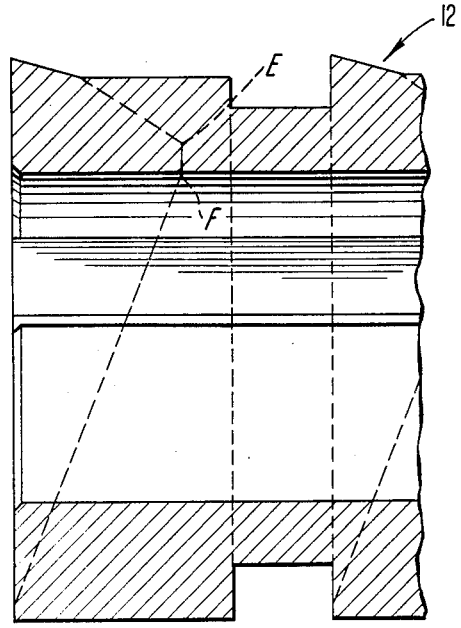
Figure 15:
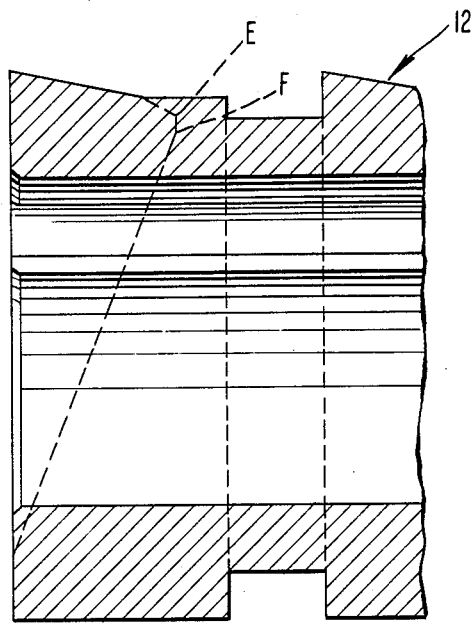

The cam elements 14 are formed with a base cam track 65 on the right edge thereof as shown in FIGS. 12–18. Referring to FIGS. 10 and 12, the cam track 65 has three dwell segments. The dwell segments are arcs of circles each having their centers at the axis of shaft 11 and, therefore, the pistons 15 are not moved along their axis while the rollers 19 are traversing these dwell segments. The three dwell segments are identified on FIG. 12 as the PISTON OUT DWELL, between points A and B; the PISTON FLUSH DWELL, between points C and D; and the LOADING DWELL, between points E and F.

During the PISTON OUT DWELL, as shown in FIG. 3, the ends of the pistons 15 are extended past the surface of the cylinder 10 carrying a slug of icing. During this dwell segment, the piston is moved past a wire (not shown) which strip the icing slug from the cylinder allowing it to drop on one of a line of base cakes being transported on a conveyor 66 below the cylinder.

As the cylinder rotates moving the piston from point B to point C, the piston retracts to a position flush with the surface of the cylinder 10. The piston remains in this flush position through the PISTON FLUSH DWELL segment of the cam track 65 between points C and D. As the piston travels from point C to point D, it moves under an icing hopper 67.

Between points D and E, the piston 15 is retracted, as shown in FIG. 10, drawing icing into the bore in the sleeve 22. As the piston 15 moves through the LOADING DWELL segment, it passes under a wiper blade 69 at the edge of the hopper 67. Since the piston does not move within the sleeve 22 as it passes under the blade 69, the icing slug within the sleeve 22 is of uniform thickness throughout.

The cam elements 14 are each provided with a formation 70 which extends about half way around the cam element. This formation 70 provides, as shown in FIG. 12, a curved loading dwell plane extending from the points E and F on the track 65 to the points E' and F' at the high end of the formation.

Figure 16:
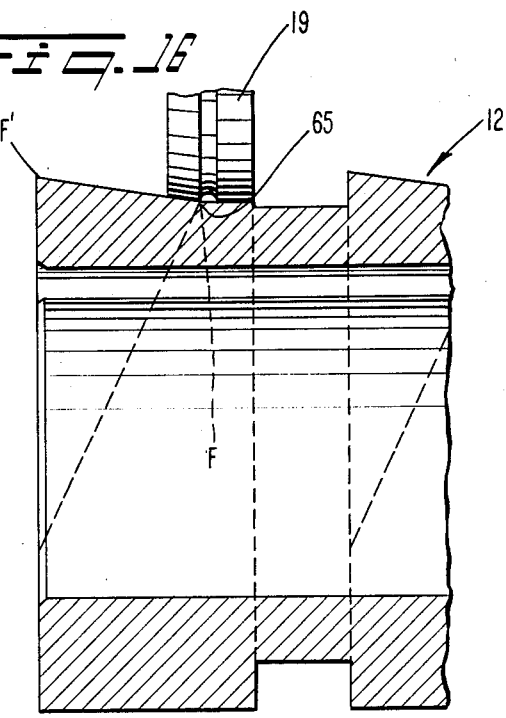
Figure 17:
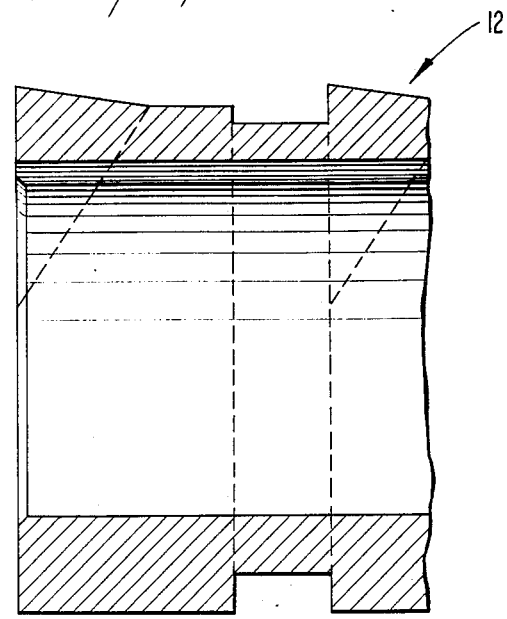
Figure 18:
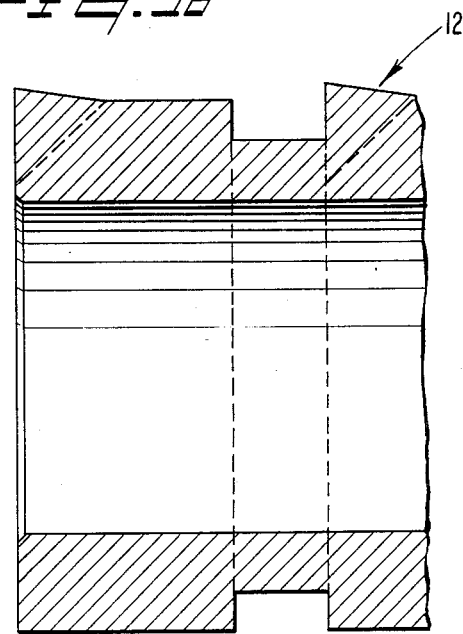

As shown in FIG. 16 (and FIGS. 4, 8 and 9), the cam following roller 19 is formed with a cylindrical portion 71 and a conical portion 72 which are separated by a groove 74. The conical portion 72 of the roller tapers at the same angle as the formation 70, and therefore, the surface of the portion 72 lies flat against the surface of the formation where the two contact each other. The cylindrical surface of the portion 71 likewise lies flat against the surface of the cam element 14 where the formation 70 is not present. It will be seen that the roller 19 may simultaneously engage both the surface of the formation 70 and the surface of the element 14 which is parallel to the axis thereof. The effective track of the roller 19 is, therefore, that defined by the path of the groove 74.

When the tubular cam 12 is in the position shown in FIGS. 2, 4, and 10, the effective track of the rollers 19 is along the track 65 shown in FIG. 12. In this position the pistons 15 deposit a slug of icing of maximum thickness upon the base cakes below. To decrease the thickness of the icing the hand wheel 47 is turned to screw the threaded ring 52 to the right along the threaded portion 44. The rod 46 is thus driven to the right. This motion is transmitted to the sleeve 39 and the tubular cam 12 by the pin 61. FIGS. 8, 9, and 11 show the tubular cam 12 at its extreme right hand position wherein a minimum thickness slug of icing is produced.

In all positions of the tubular cam 12, the pistons 15 move through exactly the same pattern between the point A and the point D in FIG. 12. Between the point D and the point A, the amplitude of the motion of the pistons 15 varies with the axial position of the tubular cam 12. However, each cam track across the surface area, defined by the points E, F, F', E', is an arc of the circle having its center on the axis of the shaft 11. Therefore, in all positions of the cam 12, the reciprocating motion of each piston ceases as it moved by the LOADING DWELL segment of the cam.

It will be seen from the foregoing that the present invention provides a cam actuating mechanism with provision for adjustment to change the stroke pattern of a reciprocating element during one portion of an operational cycle without changing the stroke pattern during another portion of the cycle. The present invention also incorporates this cam activating mechanism into a creme sandwich filling machine adjustable to produce slugs of creme filling of different thicknesses, each slug being of uniform thickness throughout.

I claim:

1. An actuator for moving a reciprocating element through an operational cycle with provision for adjustment to change the stroke pattern of the element during one portion of the cycle independently with respect to the stroke pattern during another portion of the cycle, comprising in combination: a cam; a cam follower engaging said cam; means for connecting said cam follower to said reciprocating element to move said element in accordance with the contour of said cam, said cam having a first track for engaging said cam follower to move said element through a predetermined stroke pattern, said first track including an outer curved perimetrical surface extending parallel to a central axis, said cam also having a formation laterally adjacent to said first track and sloping from said first track at an angle with respect to said central axis, said cam having a surface including said formation providing a plurality of cam follower tracks parallel to said first track for producing various stroke patterns for said element, said cam follower including a cylindrical portion engageable with said first track and a conical portion engageable with said formation; means for moving said cam laterally with respect to said cam follower to position said follower on a selected one of said tracks; and means for moving the cam with respect to said cam follower so that said follower travels the length of said cam along said selected track.

2. An actuator according to claim 1 wherein said cam is formed with a dwell portion extending across said tracks, said dwell portion having the same effective contour at each of said tracks, whereby each of said tracks places said reciprocating element in the same position when said cam follower moves across said dwell portion.

3. An actuator according to claim 2 wherein said cam includes an outer curved perimetrical surface, which surface is contoured with respect to said central axis.

4. Apparatus according to claim 3 including an annular cylindrical body mounted for rotation about said central axis, said body having a bore intersecting the outer cylindrical surface thereof, further including mounted over said body, said cam follower being mounted inside said body, said reciprocating element being a piston mounted in said bore to draw material from said hopper whereby lateral movement of said cam changes the amount of material withdrawn from the hopper.

5. Apparatus according to claim 4 wherein said body is formed with a plurality of bores circumferentially spaced around said cam, a piston being positioned in each bore, each piston being connected to a cam follower.

6. Apparatus according to claim 5, including a stationary shaft, said cam being mounted on said shaft to slide along said shaft to move said cam laterally with respect to said followers, the axis of said shaft being said central axis, further including means for holding against rotation, said body being rotatably mounted upon said shaft.

7. Apparatus according to claim 6 wherein said cam has an elongated tubular shape formed with a series of curved cam surfaces in spaced positions along the length thereof, and wherein a set of circumferentially spaced cam followers and pistons are mounted in said body in alignment with each of said cam surfaces.

8. An apparatus for drawing variable measured amounts of material from a reservoir, comprising in combination;

a stationary shaft;

an annular cylindrical body mounted on said stationary shaft for rotation about a central axis of said shaft, said body being formed with a plurality of circumferentially spaced, substantially radial bores;

a hopper mounted over said body for containing the reservoir of material to be drawn;

a plurality of pistons each slidably disposed in a respective one of said bores for drawing material from said hopper during rotation of said body;

a plurality of cam followers each coupled to a respective one of said pistons at an end thereof disposed inside said body;

a cam having an outer curved primetrical surface slidably mounted to said shaft, whereby said cam is laterally shiftable with respect to said cam followers, said cam having a first track for engaging said cam followers, said cam having a first track for engaging said cam followers to move said pistons through a predetermined stroke pattern, said cam also having a formation laterally adjacent to said first track and sloping from said first track, said cam having a surface including said formation providing a plurality of cam follower tracks parallel to said first track for producing various stroke patterns for said pistons;

means for moving said cam laterally with respect to said cam followers to position said followers on a selected one of said tracks, said means for moving including a longitudinally movable rod partially disposed in a longitudinal bore in said shaft, said means for moving further including a radially extending pin operatively coupled to said rod and to said cam and traversing a diametrically extending slot in said shaft; and means for rotating said body about said axis so that said followers travel about said cam along said selected track.

9. Apparatus according to claim 8 wherein said first track includes an outer curved primetrical surface extending parallel to said central axis, said formation sloping from said first track at an angle with respect to said central axis, said cam followers each including a cylindrical portion engageable with said first track and a conical portion engageable with said formation.

* * * * *